United States Patent Office 3,474,084
Patented Oct. 21, 1969

3,474,084
REACTIVE MONOAZO DYESTUFFS CONTAINING TWO CHLOROTRIAZINE GROUPS
Geoffrey Griffiths and Brian Neville Parsons, Manchester, England, assignors to Imperial Chemical Industries Limited, London, England, a corporation of Great Britain
No Drawing. Filed Apr. 1, 1965, Ser. No. 444,820
Claims priority, application Great Britain, Apr. 7, 1964, 14,279/64; Dec. 21, 1964, 51,898/64
Int. Cl. C09b 62/48, 49/12
U.S. Cl. 260—153
6 Claims

ABSTRACT OF THE DISCLOSURE

Dyestuffs of the formula: T—A—N=N—E—T where A stands for the radical of a diazo component, E stands for a hydroxynaphthalene radical connected to the azo group in o-position to the hydroxyl group and having 1 or 2 sulphonic acid groups and each T stands for a radical of the formula:

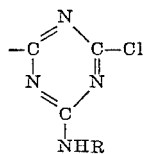

wherein R is a benzene radical having at least one sulphonic acid group and each T is connected to A or to E through a nitrogen atom. These dyestuffs exhibit an unusually high level of fixation on cellulose textile material.

---

This invention relates to a new and improved method of colouring cellulose textile materials with reactive dyes, and to certain preferred classes of dyestuffs used in this process.

A disadvantage of almost all commercial reactive dyes presently marketed is that the proportion of dyestuff entering into chemical reaction when fixed in the manner recommended by the manufacturers rarely exceeds 70%. Thus, to give effect to the full fastness to wet treatments obtainable from reactive dyes it is usually necessary to give prolonged washing treatments to the printed material to remove unreacted dyestuffs.

According to the present invention an unusually high level of fixation of reactive dyes on cellulose, especially cotton, textile material is obtained by using as the reactive dye certain classes which contain at least two reactive groups and at least one SO₃H group in the dyestuff molecule, applying the dye by padding or printing and fixing the dye on the material by a heat treatment at a temperature of 110 to 180° C. until a minimum of 90% and preferably 95% by weight of the dyestuff has reacted with the textile material.

The dyestuffs used in the new process fall into 3 broad chromophoric classes, namely, (a) Dyestuffs containing an anthraquinone nucleus;

(b) Dyestuffs containing a copper phthalocyanine nucleus, and (c) Azo dyes, including metal-complex, such as 1:1-copper and 1:2-chromium and cobalt azo dyes, containing two reactive groups for each azo group.

As examples of dyestuffs which can be used in the new process there may be mentioned those of the following general classes:

(1) Dyes having a single structure contributing colour (a) Dyes represented by the formula:

A—D—A where D represents the portion of the molecule providing the whole of the colour and the two symbols A represent the same or different reactive groups attached to different aromatic nuclei of the dyestuff, in the case of heterocyclic reactive groups, preferably through an extracyclic nitrogen atom.

(b) D—A'—x—A where D has the meaning just stated, A' is a reactive group attached to an aromatic nucleus of D and A is a second reactive group attached to A' through colourless non-reactive linking moiety x. As can be seen, whereas A can have the sole function of a reactive group, it is necessary for A' to serve both as a linking means and a reactive group.

(c) 

where D, and x have the meanings stated above, and the two symbols A represent the same or different reactive groups both connected to the linking group x.

(2) Dyes having more than one structure contributing colour

Dyes of the formula:

(e) 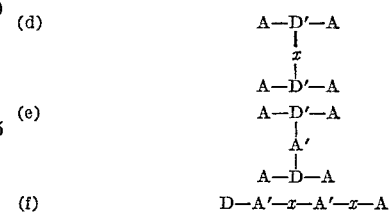

(f)    D—A'—x—A'—x—A where D and D' represent coloured moieties, A and A' are reactive groups, A' and D' serving also in part as linking groups, and x has the meaning stated above.

A special case of linking group under Formula (d) is the situation where x represents a metal atom forming a 1:2-complex with a metallisable dyestuff represented by D'.

By a reactive group is meant a group whose presence in the dyestuff molecule confers the ability to the dyestuff of entering into chemical reaction with the hydroxyl groups of the cellulose molecule in the presence of alkaline reagents whereby the dyestuff becomes chemically linked to the cellulose molecule.

A in the above formulae can represent, for example, a β - halogenopropionylamino, γ - chloro-β - hydroxypropylamino, γ-chloro-β-hydroxy-propoxy-, β-halogenoethylsulphonyl, β-halogenoalkylsulphamyl, e.g. β-chloro-ethylsulphamyl, γ - chloro - β - hydroxypropylsulphamyl, β,γ-dichloropropyl-sulphamyl, β-sulphatoethylsulphonyl, β-sulphatoethylsulphamyl, chloro - acetylamino, β - (chloromethyl) - β - sulphatoethylsulphamyl, acryloylamino, β- (alkyl- and aryl-sulphonyloxy)alkyl sulphonyl, β-acyloxyalkylsulphonyl, vinyl-sulphonyl, alkyl phosphite or sulphon fluoride radical, or more particularly a heterocyclic radical having 2 or 3 nitrogen atoms in the heterocyclic nucleus, for example s-triazine, pyrimidine or quinoxaline, and having one or more labile atoms or groups connected to the carbon atoms of the heterocyclic nucleus.

By a labile atom or group is meant an atom or a group which is split off during the reaction of the dyestuff with the cellulose molecule. Such an atom or group is normally substituted in ortho position to at least one of the nitrogen atoms in the heterocyclic nucleus, and readily dissociates under the influence of heat or alkalis, especially in the presence of moisture, to form an ion or an uncharged molecule. As examples of such atoms or groups, there may be mentioned, for example, bromine, or, preferably, chlorine atoms, sulphonic acid groups, thiocyano groups, negatively substituted aryloxy and arylthio groups, such as sulphophenoxy, sulphophenylthio, nitrosulphophenoxy, disulphophenoxy and sulphonaphthoxy groups; quaternary ammonium; groups of the formula:

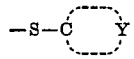

where Y represents the group of atoms necessary to form a 5- or 6-membered heterocyclic ring which may carry substituents or form part of a fused ring system; groups of the formula:

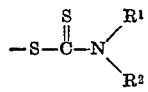

wherein $R^1$ and $R^2$ each represents the same or different alkyl, cycloalkyl, aryl or aralkyl groups, or $R^1$ and $R^2$ together form, together with the nitrogen atom, a 5- or 6-membered heterocyclic ring; and groups of the formula:

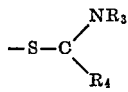

wherein $R_3$ and $R_4$ may be the same or different and each represents a hydrogen atom or an alkyl, aryl or aralkyl group.

However, the symbol A' has a more restricted meaning since it must function as a linking group as well as a reactive group. As examples of groups represented by A', there may be mentioned s-triazine and pyrimidine groups substituted by a labile atom or group as hereinbefore defined.

x in the above formulae can represent, for example, a non-reactive triazine or pyrimidine nucleus, an anilino radical or the radical of an aliphatic or aromatic diamine or diamide.

Preferred classes of dyestuffs for use in the process of the invention are those of type (a) where each A represents a 2-chloro-4-(sulphoanilino)-s-triazin - 6 - ylamino group, and those of type (b) where A' represents a 2-chloro-4,6-triazinylene radical and A a β-chloroethyl sulphonamide or β-chloropropyl sulphonamide radical.

In addition to dyestuff, the printing pastes or pad liquors used in the new colouration process can contain the usual additives for example thickening agents such as alginates and emulsion thickeners, acid binding agents, for example sodium carbonate, mild oxidising agents such as sodium m-nitrobenzene sulphonate, solubilising agents, such as urea, wetting agents, such as aqueous emulsions of sulphonated sperm oil and pine oil, ethylene oxide/phenol condensates and anti-migration agents such as formaldehyde condensates with sulphonated alkyl naphthalenes. If desired, the acid-binding agent used to fix the dyestuff on the textile material can be applied to the textile material by a separate padding treatment immediately before subjecting the material to the heating step.

The new process can be applied to a wide variety of cellulose textile material, for example regenerated cellulose such as viscose and cuprammonium rayon, linen and, preferably, cotton materials. The process can be applied, for example, to woven or knitted fabrics or to hanks or to loose fibre in sliver form. These materials may, if desired, be impregnated before the printing or padding step, by auxiliaries used in printing or padding, for example, alkalis, wetting agents, and mild oxidising agents.

The process may be carried out by application of printing paste or pad-liquor to the textile material in the usual manner, for example, by block, screen, roller, or by slop-or nip-padding and subjecting the textile material to heat treatment at from 110° to 180° C. until the required level of reaction between dyestuff and material has been achieved. This heat treatment can be carried out by a dry heat or by a superheated steam treatment. For example a dry heat treatment can be carried out in a heated air stenter, a hot air flue, a baking oven or by direct contact with a heated metal plate, or by exposure to an infra red heating unit and superheated steam treatments can be carried out in a closed vessel under pressure or in an insulated chamber containing means for superheating the steam. Preferably the material is heated at two different temperatures, the first being at a relatively lower level and serving to dry the printed or padded portion of material. The resultant materials require little more than a rinse to remove thickening agent and the other additives.

Because of the high fixation obtained, the new process dispenses with the usual and prolonged washing-off treatments customary in printing and dyeing processes for reactive dyes, and as a result offers economies in time, water, steam and detergents. Also the dye is employed more usefully and economically, in that almost the whole is fixed on the cellulose, rather than about 30% having to be removed by exhaustive washing and discarded.

The invention is illustrated but not limited by the following examples in which parts and percentages are by weight:

Example 1

The dye having the constitution shown below:

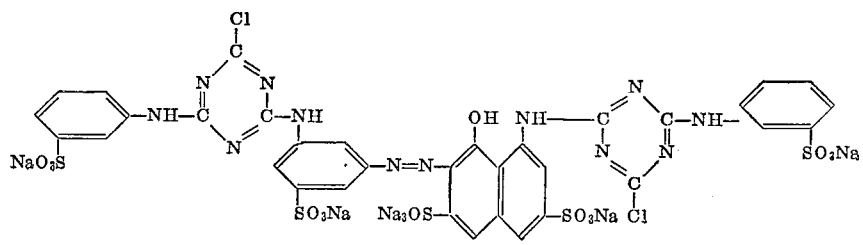

coloured to a strong bluish-red shade which has good fastness to severe washing treatments, adjacent white viscose also being free from staining.

Example 7

The dye having the constitution shown below:

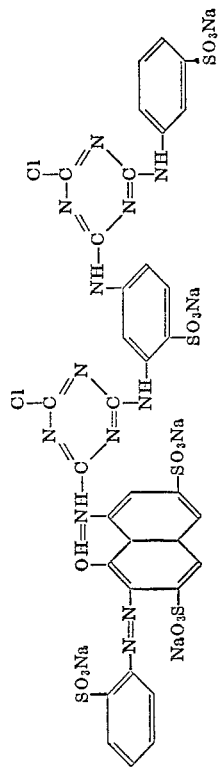

is dissolved in water and made up into a printing paste according to the recipe:

| | Parts |
|---|---|
| Dye | 3 |
| Urea | 15 |
| Water | 46 |
| 4% aqueous sodium alginate solution | 35 |
| Sodium m-nitrobenzene sulphonate | 1 |
| | 100 |

The print paste is applied from a roller to staple viscose fabric and is dried for 5 minutes at 60° C.

The printed fabric is then passed through a pad liquor of the constitution:

| | Parts |
|---|---|
| Sodium metasilicate | 10 |
| Sodium carbonate (anhydrous) | 15 |
| Potassium carbonate (anhydrous) | 5 |
| Sodium chloride | 5 |
| Gum tragacanth thickening | 10 |
| Water (parts by volume) | 100 |

The fabric is then squeezed between rollers, so as to retains its equal weight of liquor, and is immediately passed into a chamber containing superheated steam at 150° C., so that the time of transit is 20 seconds.

A bluish-red print is obtained, and the fixation of dye is at least 90%. If the unwashed print is subjected to wet fastness tests, such as the I.S.O. Water Test, little or no staining of adjacent white material is caused.

In view of the treatment in the strongly alkaline pad liquor, however, it is desirable to submit the printed fabric to a rinse or mild washing treatment.

The following Table A lists examples of other dyestuffs and their shade and percentage fixation when applied to cotton fabric by the baking method disclosed in Example 1 or to viscose rayon fabric by the steaming method disclosed in Example 1.

TABLE A

| Example | Dyestuff | Shade | Fixation on Cotton | Fixation on Viscose rayon |
|---|---|---|---|---|
| A1 | 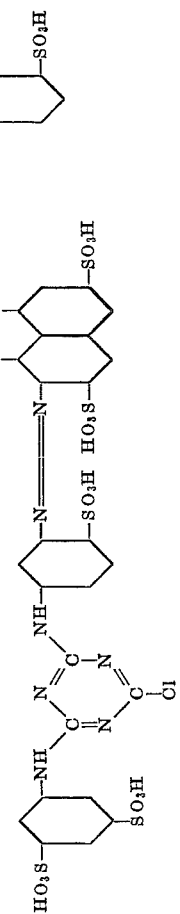 | Bluish-red | 90 | 97 | is dissolved in water and made up into a printing paste according to the recipe:

| | Parts |
|---|---|
| Dye | 2 |
| Urea | 20 |
| Water | 40.5 |
| 4% aqueous sodium alginate solution | 35 |
| Sodium m-nitrobenzene sulphonate | 1 |
| Anhydrous sodium carbonate | 1.5 |
| | 100 |

The print paste is applied by roller print to an unmercised cotton fabric, and is dried for 5 minutes at 60° C. The printed fabric is then subjected to a dry-heat treatment at 150° C. for 5 minutes or to a treatment for 30 seconds with steam superheated to 150° C.

Bluish-red prints are obtained, and the fixation of dye is at least 95%. If the unwashed prints are subjected to wet treatments, such as I.S.O. Water Test or I.S.O. Wash Test No. 2, little or no staining of adjacent white material is caused.

Example 2

If the dye in Example 1 is replaced by that of the formula:

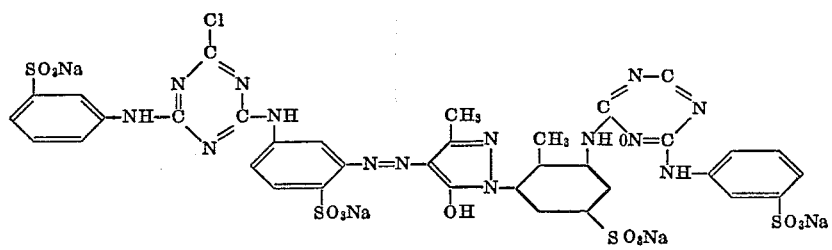

bright greenish yellow prints on mercerised cotton of excellent fastness to washing are obtained, even when the prints receive no "soaping" treatment.

Example 3

If the dye in Example 1 is replaced with:

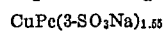

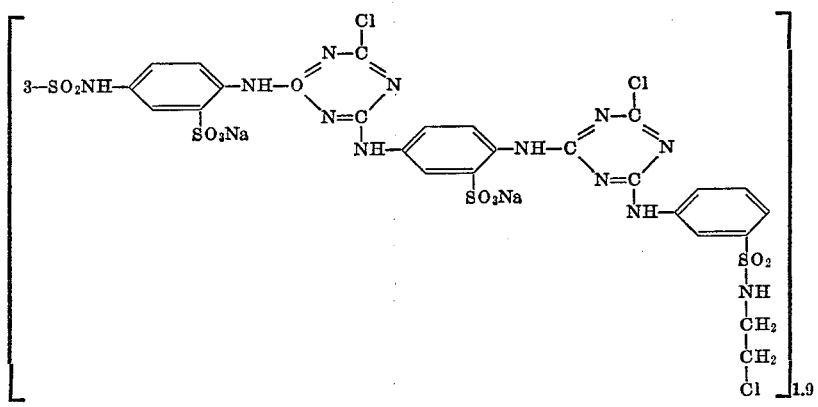

and the paste is printed on mercised cotton fabric, turquoise prints are obtained, which give very little staining on adjacent white materials in a water test even when tested without any soaping treatment.

A padding liquor is prepared with the following composition

| | Parts |
|---|---|
| Dyestuffs of Example 1 | 1.5 |
| Urea | 20 |
| Sodium triisopropylnanphthalene sulphonate | 5 |
| Soda ash | 2 |
| Water | 71.5 |

A plainweave bleached cotton fabric is passed through this solution and squeezed between rollers until the cloth has absorbed its own dry weight of liquor. The fabric is dried at 70° C. and then heated in a stream of dry air at 160° C. for 3 minutes, or for 30 seconds at 150° C. in an atmosphere of super-heated steam.

Bluish-red dyeings are obtained in which less than 5% of the dye applied is not reacted with the fibre. The unsoaped dyeings show very little staining of adjacent cotton when subjected to a severe washing test (I.S.O. No. 4).

Example 5

A pad liquor is prepared having the following composition

| | Parts |
|---|---|
| Dye used in Example 2 | 2 |
| Urea | 20 |
| Sodium alignate (4% aqueous solution) | 10 |
| Soda ash | 2 |
| Water | 66 |
| | 100 |

A poplin weave mercised cotton fabric is passed through the solution and squeezed between rollers until the fabric has absorbed its own dry weight of padding liquor. The fabric is dried at 70° C. and then heated at 160° C. in an oven for 3 minutes, or treated at 160° C. for 1 minute in superheated steam.

The unsoaped dyeing gives no staining of adjacent cotton material when subjected to a water or perspiration fastness test.

Example 6

A plainweave medium-spun bright viscose rayon cloth is padded through a solution at 20° C.–30° C. containing, per 1000 parts liquor, 200 parts parts of urea, 10 parts of sodium carbonate and 40 parts of the dyestuff used in Example 1. The cloth is then squeezed uniformly by passage through a mangle, so as to retain its equal weight of dye liquor. The cloth is then stored for a period of 1–2 hours preferably 2 hours, in such a state that evaporation of liquor from the cloth cannot occur, and is then dried in a hot-air drier at 70°–100° C. The cloth is then baked at 125° C. for 5 minutes being then

TABLE A—Continued

| Example | Dyestuff | Shade | Fixation on Cotton | Fixation on Viscose rayon |
|---|---|---|---|---|
| A2 | [CuPc](3—SO₃Na)₂.₃(3—SO₂NH—C₆H₄—NH—C₃N₃Cl—NH—C₆H₄(SO₃H)—SO₂NHCH₂CH₂Cl) | Turquoise | 96 | 93 |
| A3 | [CuPc](3—SO₃Na)₂.₃(3—SO₂NH—C₆H₄—NH—C₃N₃Cl—N(CH₂CH₂)₂N—C₃N₃Cl—NH—C₆H₄(SO₃H)—SO₂NHCH₂CH₂Cl) | Turquoise | 98 | 95 |
| A4 | [CuPc](3—SO₃Na)₁.₄(3—SO₂NHCH₂—N(CH₂CH₂OH)—C₃N₃(OCH₃)—C₆H₃(SO₃Na))₂.₆ | Turquoise | 95 | 80 |
| A5 | A 7:3 mixture of the 1:2-Cr- and 1:2-Co complexes of azo dye with triazinyl-NH group bearing SO₂NHCH₂CH₂Cl | Black | 97 | 95 |

3,474,084

TABLE A—Continued

| Example | Dyestuff | Shade | Fixation on Cotton | Fixation on Viscose rayon |
|---|---|---|---|---|
| A6 | | Bluish-red | 92 | 93 |
| A7 | | Turquoise | 99 | 96 |
| A8 | | Blue | 92 | 85 |
| A9 | | Blue | 91 | 85 |

TABLE A—Continued

| Dyestuff | Shade | Fixation on Cotton | Fixation on Viscose Rayon |
|---|---|---|---|
| A10 | Golden yellow | 92 | 91 |
| A11 | Golden yellow | 93 | 93 |
| A12 | Yellow | 94 | 93 |
| A13 | Greenish yellow | 94 | 93 |
| A14 | Bluish red | 95 | 95 |

TABLE A—Continued

| Dyestuff | Shade | Fixation on Cotton | Fixation on Viscose Rayon |
|---|---|---|---|
| A15 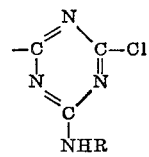 | Bluish red | 96 | 97 |

A preferred class of dyestuffs for use in the new process is the novel class of dyestuffs of the formula:

$$T—A—N=N—E—T$$

where A stands for the radical of a diazo component, e.g. a disulphonaphthylene but preferably a sulphophenylene radical, E stands for a hydroxynaphthylene radical connected to the azo group in o-position to the hydroxyl group and having 1 or 2 sulphonic acid groups, and each T stands for a radical of the formula:

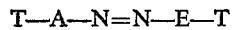

wherein R is a benzene radical having at least one sulphonic acid group and which may also be substituted by chlorine, methyl, methoxy or carboxy, and each T is connected to A or to E through a nitrogen atom.

These dyestuffs can be obtained either by coupling a diazotised amine of the formula T—A—NH$_2$ with a coupling component of the formula: H—E—T or by condensing 2 moles of cyanuric chloride in either order with 2 moles of an aniline compound having at least one sulphonic acid group and with one mole of an azo compound of the formula: X—A—N=N—E—X wherein each X represents an acylatable amino group and A and E have the meanings stated above.

These dyestuffs can also be obtained by coupling a diazotised amine of the formula: T$^3$—A—NH$_2$ with a coupling component of the formula H—E—T$^3$ wherein A and E have the meanings stated above and T$^3$ stands for a dichloro-s-triazin-2-yl group attached to A or to E, as the case may be, through a linking nitrogen atom, and condensing the product so obtained with two moles of an amine of the formula NR$_2$.R where R has the meaning stated above. These dyestuffs can also be obtained by condensing one mole of an amine of the formula NH$_2$.R, where R has the meaning stated above, with an azo compound of the formula: T$^4$—A—N=N—E—T$^4$ where A and E have the meanings stated above, one T$^4$ represents a dichloro-s-triazin-2-yl group and the other represents a group of the formula:

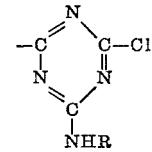

each T$^4$ being connected to A or to E, as the case may be, through a linking nitrogen atom.

These dyestuffs and the processes for their manufacture form further features of the invention. Their preparation is illustrated, but not limited, by Examples 8 to 12 inclusive and Table B.

Example 8 illustrates the procedure wherein the dyestuff used in Example 1 is obtained by coupling a diazotised amine of the formula H—E—T. Examples 9 to 13 illustrate the five methods of obtaining the same dyestuff where the final stage comprises a condensation step.

For synthesis of the additional examples of the invention disclosed in Table B by the method of Example 8, the compound named in the second column and the amine named in the fourth column are condensed with cyanuric chloride to provide the amine of formula T—A—NH$_2$; whilst the compound named in the third column and the amine named in the fourth column are condensed with cyanuric chloride to provide the coupling component of formula H—E—T.

For synthesis of the same dyes by the methods described in Examples 9 and 10, the compound named in column 2 is mono-acylated, e.g. to the mono-acetyl derivative and the resultant product is diazotised and coupled with the compound named in the third column or with a mono-N-acyl derivative thereof, and the resultant azo compound is hydrolysed to provide the azo compound of formula: X—A—N=N—E—X. The amine named in the fourth column and this azo compound are condensed with cyanuric chloride to provide the new dyestuff.

For synthesis of the same dyestuffs by the method described in Example 11 the compound named in column 2 is condensed with one mole of cyanuric chloride to provide the amine of formula $NH_2.A.T^3$ and the compound named in the third column is condensed with cyanuric chloride to provide the coupling component of formula H—E—$T^3$. The first of these condensation products is diazotised and coupled with the second, and the resultant product is condensed with 2 moles of the amine named in the fourth column.

For synthesis of the same dyestuffs by the method described in Example 12, the compound named in the third column is condensed with one mole of cyanuric chloride to provide a coupling component of the formula H.E.$T^4$ where $T^4$ is a dichloro-s-triazin-2-yl group, and the compound named in the second column and one mole of the amine named in the fourth column are condensed with cyanuric chloride to provide an amine of the formula $NH_2$—A—$T^4$ where $T^4$ is a group of the formula:

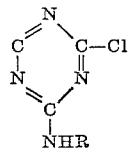

The amine so obtained is diazotised and coupled with the coupling component and the product is condensed with one mole of the amine named in the fourth column.

For synthesis of the same dye by the method described in Example 13, the compound named in the third column and one mole of the amine named in the fourth column are condensed with cyanuric chloride to obtain a coupling component of the formula: H—E—$T^4$ where $T^4$ stands for a group of the formula:

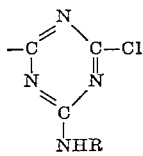

and the compound named in the second column is condensed with cyanuric chloride to obtain an amine of the formula $NH_2$—A—$T^4$ where $T^4$ is a dichloro-s-triazin-2-yl group. The amine so obtained is diazotised and coupled with the coupling component and the product is condensed with one mole of the amine named in the fourth column.

Example 8

A solution of 18.15 parts of the disodium salt of 1-amino-8-naphthol-3:6-disulphonic acid in 200 parts of water is added to a stirred suspension of 9.25 parts of cyanuric chloride in a mixture of 60 parts of acetone, 100 parts of water and 100 parts of ice. The mixture is stirred for 1 hour at a temperature between 0° and 5° C. Then a solution of 9.75 parts of the sodium salt of 1-aminobenzene-3-sulphonic acid in 100 parts of water is added, and the mixture is stirred at between 35° and 40° C., the pH being maintained at 7 by the addition of a 10% aqueous solution of sodium carbonate until the reaction is completed.

9.4 parts of 1:3-diaminobenzene-4-sulphonic acid are dissolved in 100 parts of water by the addition of 2 N sodium hydroxide solution until the pH of the solution is 7. This solution is added to a stirred suspension of 9.25 parts of cyanuric chloride in 60 parts of acetone, 100 parts of water, and 100 parts of ice. The mixture is stirred for 1 hour at between 0° and 5° C., the pH of the mixture is then adjusted to 6 by the addition of a 10% aqueous solution of sodium carbonate. When the reaction is completed, a solution of 9.75 parts of the sodium salt of 1-aminobenzene-3-sulphonic acid in 100 parts of water is added, and the mixture is stirred at between 35° and 40° C., the pH being maintained at 7 by the addition of a 10% aqueous solution of sodium carbonate until the reaction is completed. The mixture is then cooled to 0° C., 12.5 parts of a 10 N aqueous solution of hydrochloric acid are added, followed by 25 parts of a 2 N aqueous solution of sodium nitrite. When diazotisation is complete, the resulting mixture is added to the previously prepared 1 - [2'-(3''-sulphophenylamino)-4'-chloro-s-triazin-6'-yl]-amino-8-naphthol-3:6-disulphonic acid. The mixture is stirred at between 0° and 5° C., the pH being maintained at 7 by the addition of a 10% aqueous solution of sodium carbonate, until coupling is complete. The dyestuff is precipitated by the addition of sodium chloride, filtered off and dried.

Example 9

A solution of 19.5 parts of the sodium salt of 1-aminobenzene-3-sulphonic acid in 200 parts of water is added to a stirred suspension of 18.5 parts of cyanuric chloride in 120 parts of acetone, 150 parts of water, and 150 parts of ice. The mixture is stirred at between 0° and 5° C. for 1 hour, the pH of the mixture being maintained at 6 by the addition of a 10% aqueous solution of sodium carbonate. A solution of 29.2 parts of the trisodium salt of 1-amino-7-(2'-sulpho-5'-aminophenylazo)-8-naphthol-3:6-disulphonic acid in 400 parts of water is then added and the mixture is stirred at between 35° and 40° C. the pH being maintained at 7 by the addition of 10% aqueous solution of sodium carbonate until the reaction is completed. The dyestuff is precipitated by the addition of sodium chloride, filtered off and dried.

Example 10

A solution of 29.2 parts of the trisodium salt of 1-amino - 7 - (2'-sulpho-5'-aminophenylazo)-8-naphthol-3:6-disulphonic acid in 400 parts of water is added to a stirred suspension of 18.5 parts of cyanuric chloride in 120 parts of acetone, 200 parts of water and 150 parts of ice. The mixture is stirred at between 0° and 5° C., the pH being maintained at 6 by the addition of a 10% aqueous solution of sodium carbonate, until the reaction is finished. A solution of 19.5 parts of the sodium salt of 1-aminobenzene-3-sulphonic acid in 200 parts of water is then added and the mixture stirred at between 35° and 40° C., the pH being maintained at 7 by the addition of a 10% aqueous solution of sodium carbonate, until the reaction is completed. The dyestuff is precipitated by the addition of sodium chloride, filtered off and dried.

Example 11

A solution of 18.15 parts of the disodium salt of 1-amino-8-naphthol-3:6-disulphonic acid in 200 parts of water is added to a stirred suspension of 9.25 parts of cyanuric chloride in a mixture of 60 parts of acetone, 100 parts of water, and 100 parts of ice. The mixture is stirred for 1 hour at a temperature between 0° and 5° C.

9.4 parts of 1:3-diaminobenzene-4-sulphonic acid are dissolved in 100 parts of water by the addition of 2 N sodium hydroxide solution until the pH of the solution is 7. This solution is added to a stirred suspension of 9.25 parts of cyanuric chloride in 60 parts of acetone, 100 parts of water, and 100 parts of ice. The mixture is stirred for 1 hour at between 0° and 5° C., the pH of the mixture is then adjusted to 6 by the addition of a 10% aqueous solution of sodium carbonate. When the reaction is completed the mixture is cooled to 0° C., 12.5 parts of a 10 N aqueous solution of hydrochloric acid are added, followed by 25 parts of a 2 N aqueous solution of sodium nitrate. When diazotisation is complete, the resulting mixture is added to the previosuly prepared 1-(2':4'-dichloro-s-triazin-6'-yl)amino - 8-naphthol-3:6-disulphonic acid. The mixture is stirred at between 0° and 5° C., the pH being maintained at 7 by the addition of a 10% aqueous solution of sodium carbonate, until coupling is complete.

A solution of 19.5 parts of the sodium salt of 1-aminobenzene-3-sulphonic acid in 200 parts of water is then added and the mixture stirred at between 35° C. and 40° C., the pH being maintained at 7 by the addition of a 10% aqueous solution of sodium carbonate, until the reaction is completed. The dyestuff is precipitated by the addition of sodium chloride, filtered off and dried.

Example 12

A solution of 18.15 parts of the disodium salt of 1-amino-8-naphthol-3:6-disulphonic acid in 200 parts of water is added to a stirred suspension of 9.25 parts of cyanuric chloride in a mixture of 60 parts of acetone, 100 parts of water, and 100 parts of ice. The mixture is stirred for 1 hour at a temperature between 0° and 5° C.

9.4 parts of 1:3-diaminobenzene-4-sulphonic acid are dissolved in 100 parts of water by the addition of 2 N sodium hydroxide solution until the pH of the solution is 7. This solution is added to a stirred solution of 9.25 parts of cyanuric chloride in 60 parts of acetone, 100 parts of water and 100 parts of ice. The mixture is stirred for 1 hour between 0° C. and 5° C., the pH of the mixture is then adjusted to 6 by the addition of a 10% aqueous solution of sodium carbonate. When the reaction is complete, a solution of 9.75 parts of the sodium salt of 1-aminobenzene-3-sulphonic acid in 100 parts of water is added, and the mixture is stirred at between 35° and 40° C., the pH being maintained at 7 by the addition of a 10% aqueous solution of sodium carbonate until the reaction is completed. The mixture is then cooled to 0° C., 12.5 parts of a 10 N aqueous solution of hydrochloric acid are added, followed by 25 parts of a 2 N aqueous solution of sodium nitrite. When diazotisation is complete, the resulting mixture is added to the previously prepared 1-(2'-4'-dichloro-s-triazin-6'-yl)amino - 8 - naphthol-3:6-disulphonic acid. The mixture is stirred at between 0° and 5° C., the pH being maintained at 7 by the addition of a 10% aqueous solution of sodium carbonate, until coupling is complete.

A solution of 9.75 parts of the sodium salt of 1-aminobenzene-3-sulphonic acid in 100 parts of water is then added, and the mixture stirred at between 35° and 40° C., the pH being maintained at 7 by the addition of a 10% aqueous solution of sodium carbonate, until the reaction is completed. The dyestuff is precipitated by the addition of sodium chloride, filtered off and dried.

Example 13

A solution of 18.15 parts of the disodium salt of 1-amino-8-naphthol-3:6-disulphonic acid in 200 parts of water is added to a stirred suspension of 9.25 parts of cyanuric chloride in a mixture of 60 parts of acetone, 100 parts of water, and 100 parts of ice. The mixture is stirred for 1 hour at between 0° and 5° C. Then a solution of 9.75 parts of the sodium salt of 1-aminobenzene-3-sulphonic acid in 100 parts of water is added, and the mixture is stirred at between 35° and 40° C., the pH being maintained at 7 by the addition of a 10% aqueous solution of sodium carbonate until the reaction is completed.

9.4 parts of 1:3-diaminobenzene-4-sulphonic acid are dissolved in 100 parts of water by the addition of 2 N sodium hydroxide solution until the pH of the solution is 7. This solution is added to a stirred suspension of 9.25 parts of cyanuric chloride in 60 parts of acetone, 100 parts of water and 100 parts of ice. The mixture is stirred for 1 hour at between 0° and 5° C., the pH of the mixture is then adjusted to 6 by the addition of a 10% aqueous solution of sodium carbonate. When the reaction is completed the mixture is cooled to 0° C., 12.5 parts of a 10 N aqueous solution of hydrochloric acid are added, followed by 25 parts of a 2 N aqueous solution of sodium nitrite. When diazotisation is complete, the resulting mixture is added to the previously prepared 1-[2'-(3''-sulphophenylamino) - 4' - chloro - s - triazin - 6' - yl] - amino - 8 - naphthol-3:6-disulphonic acid. The mixture is stirred at between 0° and 5° C., the pH being maintained at 7 by the addition of a 10% aqueous solution of sodium carbonate, until coupling is complete. A solution of 9.75 parts of the sodium salt of 1-aminobenzene-3-sulphonic acid in 100 parts of water is then added, and the mixture is stirred at between 35° and 40° C., the pH being maintained at 7 by the addition of a 10% aqueous solution of sodium carbonate, until the reaction is completed. The dyestuff is precipitated by the addition of sodium chloride, filtered off and dried.

TABLE B

| Example | | | | Shade |
|---|---|---|---|---|
| B1 | 1:3-diaminobenzene-4-sulphonic acid | 1-amino-8-naphthol-3:6-disulphonic acid | Aniline-3:5-disulphonic acid | Bluish-red. |
| B2 | do | 2-amino-5-naphthol-7-sulphonic acid | 2-amino-5-sulphobenzoic acid | Orange. |
| B3 | do | 2-amino-8-naphthol-6-sulphonic acid | 1-aminobenzene-3-sulphonic acid | Scarlet. |
| B4 | do | 2-methylamino-8-naphthol-6-sulphonic acid | Aniline-3:5-disulphonic acid | Do. |
| B5 | do | 2-amino-5-naphthol-1:7-disulphonic acid | 1-aminobenzene-3-sulphonic acid | Orange. |
| B6 | do | 2-methylamino-5-naphthol-7-sulphonic acid | do | Do. |
| B7 | do | 1-amino-8-naphthol-3:6-disulphonic acid | 2-aminotoluene-4-sulphonic acid | Bluish-red. |
| B8 | do | 2-amino-8-naphthol-6-sulphonic acid | 2-amino-4-sulphobenzoic acid | Scarlet. |
| B9 | do | 1-amino-8-naphthol-4:6-disulphonic acid | 1-aminobenzene-4-sulphonic acid | Red. |
| B10 | do | 2-amino-5-naphthol-1:7-disulphonic acid | 2-aminotoluene-5-sulphonic acid | Orange. |
| B11 | do | 1-amino-8-naphthol-4-sulphonic acid | Aniline-3:5-disulphonic acid | Red. |
| B12 | do | 1-amino-8-naphthol-3:6-disulphonic acid | 2-amino-5-sulphobenzoic acid | Bluish-red. |
| B13 | 1:4-diaminobenzene sulphonic acid | 2-methylamino-8-naphthol-6-sulphonic acid | 1-aminobenzene-3-sulphonic acid | Red. |
| B14 | do | 1-amino-8-naphthol-3:6-disulphonic acid | 2-amino-4-sulphobenzoic acid | Bluish-red. |
| B15 | do | 2-amino-5-naphthol-1:7-disulphonic acid | 2-aminotoluene-4-sulphonic acid | Reddish-orange. |
| B16 | do | 2-methylamino-5-naphthol-7-sulphonic acid | Aniline-3:5-disulphonic acid | Do. |
| B17 | do | 2-amino-8-naphthol-6-sulphonic acid | 2-amino-5-sulphobenzoic acid | Red. |
| B18 | do | 1-amino-8-naphthol-3:6-disulphonic acid | 2-aminotoluene-5-sulphonic acid | Bluish-red. |
| B19 | 1:4-diaminobenzene-2-carboxylic acid | do | 1-aminobenzene-3-sulphonic acid | Do. |
| B20 | do | 2-amino-5-naphthol-1:7-disulphonic acid | 2-amino-4-sulphobenzoic acid | Reddish-orange. |
| B21 | 2:6-diaminonaphthalene-4:8-disulphonic acid | 1-amino-8-naphthol-3:6-disulphonic acid | 1-aminobenzene-3-sulphonic acid | Bluish-red. |
| B22 | 1:3-diaminobenzene-4-sulphonic acid | do | 1-amino-4-methoxybenzene-3-sulphonic acid | Do. |
| B23 | do | do | 1-amino-4-chlorobenzene-3-sulphonic acid | Reddish-orange. |

A second preferred class of dyestuffs for use in the new process is the novel class of dyestuffs of the formula:

$T^2$—A—N=N—E'—T' wherein A stands for the radical of a diazo component, e.g. disulphonaphthylene, but preferably a sulphophenylene radical, E' represents the radical of a pyrazolone coupling component connected to the azo group in the 4-position of the pyrazole ring and carrying in the 1-position of the pyrazole ring an aromatic carbocylic, preferably monocyclic, radical and $T^2$ and T' stand for the same or different chloro-s-triazine radicals connected to carbon atoms in A and E' by way of nitrogen atoms. Especially valuable are the dyestuffs of this formula in which $T^2$ and T' each represents a 4-monochloro-s-triazin-6-yl radical in which the carbon atom of position 2 of the triazine nucleus carries an anilino radical having a sulphonic acid group and which can, in addition, contain $SO_3H$, $CO_2H$, $CH_3$, Cl or $CH_3O$ substituted on the benzene nucleus or have a methyl group attached to the nitrogen atom.

These dyestuffs can be obtained by coupling a diazotised amine of the formula $T^2$—A—$NH_2$ with a coupling component of the formula: H—E–T' or, more especially where $T^2$ and T' represent identical radicals, by introducing by the usual condensation methods, two chloro-s-triazine radicals into an azo compound of the formula:

X—A—N=N—E'—X where A and E' have the meanings stated above and X stands for the same or different acylatable amino groups.

The introduction of such radicals can be effected, for example, by reacting the azo compound with two moles of a s-triazine compound containing at least two chlorine atoms on the triazine nucleus or by reacting the azo compound with two moles of cyanuric chloride and then with an amine, more especially a sulphoaniline or a derivative thereof having in addition a further $SO_3H$ or a $CO_2H$, $CH_3$, Cl or $CH_3O$ substituent on the benzene nucleus or a methyl group on the nitrogen atom.

These dyestuffs in which at least one of T' and $T^2$ represents a monochloro-s-triazinyl group also substituted on the triazine nucleus by an amino or substituted amino group can also be obtained by condensing ammonia or an amine with an azo compound of the formula:

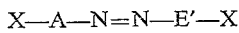

$T^3$—A—N=N—E'—$T^3$ wherein A and E' have the meanings stated above and $T^3$ represents a dichloro-s-triazin-2-yl group attached to A or to E', as the case may be, through a linking nitrogen atom, or with an azo compound of the formula $T^5$—A—N=N—E'—$T^5$ wherein A and E' have the meanings stated above, one $T^5$ stands for a dichloro-s-triazin-2-yl group and the other for a chloro-s-triazin-2-yl group, each $T^5$ being attached to A or to E', as the case may be, through a linking nitrogen atom.

The compounds of formulae $T^3$—A—N=N—E'—$T^3$ and $T^5$—A—N=N—E'—$T^5$ can be obtained by coupling a diazotised amine of the formula $T^3$—A—$NH_2$ or $T^5$—A—$NH_2$ with, respectively, a coupling component of the formula H—E—$T^3$ or H—E—$T^5$.

These dyestuffs and the processes for their manufacture form a further feature of the invention. Their preparation is illustrated, but not limited, by Examples 14 to 19 and Table C.

Example 14 describes the preparation of the dye used in Example A14 by introducing the chloro-s-triazine radicals into the monoazo compound by condensation with the primary condensation product of cyanuric chloride and metanilic acid. Example 15 describes the chemically-equivalent process for preparation of the same dyestuff by first introducing dichloro-s-triazine radicals into the monoazo compound by condensation with cyanuric chloride, and then replacing one chlorine atom in each triazine nucleus by condensation with an amine. Example 16 describes the process for preparation of the same dyestuff by diazotising an amine of the formula $T^2$—A—$NH_2$ with a coupling component of the formula H—E'—T', whilst Examples 17, 18 and 19 describe processes for preparation of the same dyestuff in which a compound of the formula 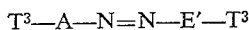 $T^3$—A—N=N—E'—$T^3$ or $T^5$—A—N=N—E'—$T^5$ is synthesised by coupling and then condensed with an amine.

Synthesis of the additional examples of the invention disclosed in Table C by the method of Example 14, is preferably limited to those in which the amines named in columns 4 and 5 are identical. For this purpose, the compound named in the second column is monoacylated, e.g. to the monoacetyl derivative, the resultant compound is diazotised and coupled with the compound named in the third column, and the resultant azo compound is hydrolysed to provide a diaminoazo compound which is condensed with the primary condensation product of cyanuric chloride and the amine named in the fourth and fifth columns. The method of Example 15 is applied to the same compounds by first forming a diaminoazo compound in the manner just indicated, condensing this with 2 moles of cyanuric chloride and condensing the product with 2 moles of the amine named in the fourth and fifth columns.

For synthesis of the dyes of Table C by the method described in Example 16, the compound named in the second column and the amine named in the fourth column are condensed with cyanuric chloride to provide the amine of formula $T^2$—A—$NH_2$; whilst the compound named in the third column and the amine named in the fifth column are condensed with cyanuric chloride to provide the coupling-component of formula H—E'—T. 

The procedure described in Example 17 is preferably limited to dyes in which $T^2$ and T' have the same meaning, i.e. to those in which the same amine is named in columns 4 and 5 of Table C.

For synthesis of the dyes of Table C by the method described in Example 17, the compound named in the second column and cyanuric acid are reacted to form an amine of formula $T^3$—A—$NH_2$ and the compound named in the third column is reacted with cyanuric chloride to form a coupling component of formula H—E'—$T^5$. After diazotisation and coupling the product is reacted with the amine named in the fourth and fifth columns.

For synthesis of the dyestuffs of Table C by the method described in Example 18, the compound named in the third column is condensed with cyanuric chloride to form a coupling component of formula H—E—$T^5$ where $T^5$ is a dichloro-s-triazin-2-yl group. The compound named in the second column and the amine named in the fourth column are reacted to form an amine of formula $T^5$—A—$NH_2$ where $T^5$ is a chloro-s-triazine group. After diazotisation and coupling, the resultant product is reacted with the amine named in column 5.

For synthesis of the dyes of Table C by the method described in Example 19, the compound named in column 3 and the amine named in column 5 are reacted with cyanuric chloride to form a coupling component of formula H—E—$T^5$ in which $T^5$ represents a chloro-s-triazin-2-yl group, whilst the compound named in column 2 is reacted with cyanuric chloride to form an amine of formula $NH_2$—A—$T^5$ in which $T^5$ is a dichloro-s-triazin-2-yl group. After diazotisation and coupling, the resultant product is reacted with the amine named in column 4.

Example 14

A solution of 19.5 parts of the sodium salt of 1-aminobenzene-3-sulphonic acid in 200 parts of water is added to a stirred suspension of 18.5 parts of cyanuric chloride in 120 parts of acetone, 150 parts of water, and 150 parts of ice. The mixture is stirred at between 0° C. and 5° C. for 1 hour, the pH being maintained at 6 by the addition of a 10% aqueous solution of sodium carbonate. A solution of 28.9 parts of the trisodium salt of the diaminomonoazo compound obtained by coupling diazotised 3-aminoacetanilide-4-sulphonic acid with 1-(2'-methyl-3'- amino - 5' - sulphophenyl)-3-carboxy-5-pyrazolone, with subsequent hydrolysis of the acetylamino group, in 400 parts of water is added and the mixture is stirred at between 35° and 40° C., the pH being maintained at 7 by the addition of a 10% aqueous solution of sodium carbonate, until the reaction is completed. The dyestuff is precipitated by the addition of sodium chloride, filtered off and dried.

Example 15

A solution of 28.9 parts of the trisodium salt of 1-(2'- methyl - 3' - amino - 5'-sulpho)phenyl-3-carboxy-4-(2''-sulpho-5''-aminophenyl)azo-5-pyrazolone in 400 parts of water is added to a stirred suspension of 18.5 parts of cyanuric chloride in 120 parts of acetone, 200 parts of water, and 150 parts of ice. The mixture is stirred at between 0° and 5° C., the pH being maintained at 6 by the addition of a 10% aqueous solution of sodium carbonate, until the reaction is completed. A solution of 19.5 parts of the sodium salt of 1-aminobenzene-3-sulphonic acid in 200 parts of water is then added, and the mixture stirred at between 35° and 40° C., the pH being maintained at 7 by the addition of a 10% aqueous solution of sodium carbonate, until the reaction is completed. The dyestuff is precipitated by the addition of sodium chloride, filtered off and dried.

Example 16

A solution of 17.8 parts of the disodium salt of 1-2'-methyl - 3' - amino - 5' - sulphophenyl)-3-carboxy-5-pyrazolone in 200 parts of water is added to a stirred suspension of 9.25 parts of cyanuric chloride in a mixture of 60 parts of acetone, 100 parts of water, and 100 parts of ice. The mixture is stirred at between 0° and 5° C., the pH being maintained at 6 by the addition of a 10% aqueous solution of sodium carbonate, until the reaction is completed. A solution of 9.75 parts of the sodium salt of 1-aminobenzene-3-sulphonic acid in 100 parts of water is added and the mixture stirred at between 35° and 40° C., the pH being maintained at 7 by the addition of a 10% aqueous solution of sodium carbonate, until the reaction is completed.

9.4 parts of 1:3-diaminobenzene-4-sulphonic acid are dissolved in 100 parts of water by the addition of 2 N sodium hydroxide solution until the pH of the solution is 7. This solution is added to a stirred suspension of 9.25 parts of cyanuric chloride in 60 parts of acetone, 100 parts of water, and 100 parts of ice. The mixture is stirred for 1 hour at between 0° and 5° C., the pH of the mixture is then adjusted to 6 by the addition of a 10% aqueous solution of sodium carbonate. When the reaction is completed, a solution of 9.75 parts of the sodium salt of 1-aminobenzene-3-sulphonic acid in 100 parts of water is added, and the mixture stirred at between 35° and 40° C., the pH being maintained at 7 by the addition of a 10% aqueous solution of sodium carbonate until the reaction is completed. The mixture is cooled to 0° C., 12.5 parts of a 10 N aqueous solution of hydrochloric acid are added, followed by 25 parts of a 2 N aqueous solution of sodium nitrite. When diazotisation is complete, the resulting mixture is added to the previously prepared 1-{2' - methyl - 3' - [2'' - (3'''-sulphophenyl)amino-4''-chloro-s-triazin - 6'' - yl]amino - 5' - sulpho}phenyl-3-carboxy-5-pyrazolone. The mixture is stirred at between 0° and 5° C., the pH being maintained at 7 by the addition of a 10% aqueous solution of sodium carbonate, until coupling is complete. The dyestuff is precipitated by the addition of sodium chloride, filtered off and dried.

Example 17

A solution of 17.8 parts of the disodium salt of 1-(2'-methyl - 3' - amino-5'-sulphophenyl)-3-carboxy-5-pyrazolone in 200 parts of water is added to a stirred suspension of 9.25 parts of cyanuric chloride in a mixture of 60 parts of acetone, 100 parts of water, and 100 parts of ice. The mixture is stirred at between 0° and 5° C., the pH of the mixture being maintained at 6 by the addition of a 10% aqueous solution of sodium carbonate, until the reaction is completed.

9.4 parts of 1:3-diaminobenzene-4-sulphonic acid are dissolved in 100 parts of water by the addition of 2 N sodium hydroxide until the pH of the solution is 7. This solution is added to a stirred suspension of 9.25 parts of cyanuric chloride in 60 parts of acetone, 100 parts of water and 100 parts of ice. The mixture is stirred for 1 hour at between 0° and 5° C., the pH of the mixture is then adjusted to 6 by the addition of a 10% aqueous solution of sodium carbonate. When the reaction is completed the mixture is cooled to 0° C., 12.5 parts of a 10 N aqueous solution of hydrochloric acid are added, followed by 25 parts of a 2 N aqueous solution of sodium nitrite. When diazotisation is complete, the resulting mixture is added to the previously prepared 1-{2'-methyl-3'[2'':4''-dichloro-s-triazin - 6'' - yl]amino - 5' - sulpho}phenyl-3-carboxy-5-pyrazolone. The mixture is stirred at between 0° and 5° C., the pH being maintained at 7 by the addition of a 10% aqueous solution of sodium carbonate, until coupling is complete.

A solution of 19.5 parts of the sodium salt of 1-aminobenzene-3-sulphonic acid in 200 parts of water is then added, and the mixture stirred at between 35° and 40° C., the pH being maintained at 7 by the addition of a 10% aqueous solution of sodium carbonate, until the reaction is completed. The dyestuff is precipitated by the addition of sodium chloride, filtered off and dried.

Example 18

A solution of 17.8 parts of the disodium salt of 1-(2'-methyl - 3' - amino - 5' - sulphophenyl) - 3 - carboxy-5-pyrazolone in 200 parts of water is added to a stirred suspension of 9.25 parts of cyanuric chloride in a mixture of 60 parts of acetone, 100 parts of water, and 100 parts of ice. The mixture is stirred at between 0° and 5° C., the pH of the mixture being maintained at 6 by the addition of a 10% aqueous solution of sodium carbonate, until the reaction is completed.

9.4 parts of 1:3-diaminobenzene-4-sulphonic acid are dissolved in 100 parts of water by the addition of 2 N sodium hydroxide solution the pH of the solution is 7. This solution is added to a stirred suspension of 9.25 parts of cyanuric chloride in 60 parts of acetone, 100 parts of water, and 100 parts of ice. The mixture is stirred for 1 hour at between 0° and 5° C., the pH of the mixture is then adjusted to 6 by the addition of a 10% aqueous solution of sodium carbonate. When the reaction is completed, a solution of 9.75 parts of the sodium salt of 1-aminobenzene-3-sulphonic acid in 100 parts of water is added, and the mixture stirred at between 35° and 40° C., the pH being maintained at 7 by the addition of a 10% aqueous solution of sodium carbonate until the reaction is completed. The mixture is then cooled to 0° C., 12.5 parts of a 10 N aqueous solution of hydrochloric acid are added, followed by 25 parts of a 2 N aqueous solution of sodium nitrite. When diazotisation is complete, the resulting mixture is added to the previously prepared 1 - [2' - methyl - 3'(2'':4''-dichloro-s-triazin-6''-yl)amino - 5' - sulpho-phenyl-3-carboxy-5-pyrazolone. The mixture is stirred at between 0° and 5° C., the pH being maintained at 7 by the addition of a 10% aqueous solution of sodium carbonate, until coupling is completed.

A solution of 9.75 parts of the sodium salt of 1-aminobenzene-3-sulphonic acid in 100 parts of water is then added, and the mixture stirred at between 35° and 40° C., the pH being maintained at 7 by the addition of a 10% aqueous solution of sodium carbonate, until the reaction is completed. The dyestuff is precipitated by the addition of sodium chloride, filtered off and dried.

Example 19

A solution of 17.8 parts of the disodium salt of 1-(2'-methyl - 3' - amino - 5' - sulphophenyl) - 3 - carboxy- 5-pyrazolone in 200 parts of water is added to a stirred suspension of 9.25 parts of cyanuric chloride in a mixture of 60 parts of acetone, 100 parts of water, and 100 parts of ice. The mixture is stirred at between 0° and 5° C., the pH being maintained at 6 by the addition of a 10% aqueous solution of sodium carbonate, until the reaction is completed. A solution of 9.75 parts of the sodium salt of 1-aminobenzene-3-sulphonic acid in 100 parts of water is added, and the mixture stirred at between 35° and 40° C., the pH being maintained at 7 by the addition of a 10% aqueous solution of sodium carbonate, until the reaction is completed.

9.4 parts of 1:3 - diaminobenzene - 4 - sulphonic acid are dissolved in 100 parts of water by the addition of 2 N sodium hydroxide solution until the pH of the solution is 7. This solution is added to a stirred suspension of 9.25 parts of cyanuric chloride in 60 parts of acetone, 100 parts of water, and 100 parts of ice. The mixture is stirred for 1 hour at between 0° and 5° C., the pH of the mixture is then adjusted to 6 by the addition of a 10% aqueous solution of sodium carbonate. When the reaction is completed the mixture is cooled to 0° C., 12.5 parts of a 10 N aqueous solution of hydrochloric acid are added, followed by 25 parts of a 2 N aqueous solution of sodium nitrite. When diazotisation is complete, the resulting mixture is added to the previously prepared 1-{2'-methyl-3'-[2"-(3''' - sulphophenyl)amino - 4" - chloro - s - triazin - 6"-yl]amino - 5'-sulpho}phenyl-3-carboxy-5-pyrazolone. The mixture is stirred at between 0° and 5° C., the pH being maintained at 7 by the addition of a 10% aqueous solution of sodium carbonate, until coupling is complete.

A solution of 9.75 parts of the sodium salt of 1-aminobenzene-3-sulphonic acid in 100 parts of water is then added and the mixture is stirred at between 35° and 40° C., the pH being maintained at 7 by the addition of a 10% aqueous solution of sodium carbonate, until the reaction is completed. The dyestuff is precipitated by the addition of sodium chloride, filtered off and dried.

TABLE C

| Example | | | | | Shade |
|---|---|---|---|---|---|
| C1 | 1:3-diaminobenzene-4-sulphonic acid. | 1-(3'-amino-4'-sulphophenyl)-3-methyl-5-pyrazolone. | 1-aminobenzene-3-sulphonic acid. | 1-methyl-aminobenzene-3-sulphonic acid. | Greenish yellow. |
| C2 | do | 1-(2'-methyl-3'-amino-5'-sulphophenyl)-3-methyl-5-pyrazolone. | 2-amino-5-sulphobenzoic acid. | 1-aminobenzene-3-sulphonic acid. | Do. |
| C3 | do | 1-(3'-sulpho-4'-aminophenyl)-3-methyl-5-pyrazolone. | 2-aminotoluene-5-sulphonic acid. | 1-methylaminobenzene-3-sulphonic acid. | Do. |
| C4 | do | 1-(2'-methyl-3'-amino-5'-sulphophenyl)-3-carboxy-5-pyrazolone. | 1-aminobenzene-3-sulphonic acid. | 2-amino-5-sulphobenzoic acid. | Do. |
| C5 | do | 1-(3'-amino-4'-sulphophenyl)-3-methyl-5-pyrazolone. | Aniline | Aniline-3:5-disulphonic | Do. |
| C6 | do | 1-(2'-methyl-3'-amino-5'-sulphophenyl)-3-methyl-5-pyrazolone. | 1-aminobenzene-3-sulphonic acid. | 1-aminobenzene-3-sulphonic acid. | Do. |
| C7 | do | 1-(2'-methyl-3'-amino-5'-sulphophenyl)-3-carboxy-5-pyrazolone. | 1-methylaminobenzene-3-sulphonic acid. | 1-methylaminobenzene-3-sulphonic acid. | Do. |
| C8 | 1:4-diaminobenzene sulphonic acid. | 1-(3'-sulpho-4'-aminophenyl)-3-methyl-5-pyrazolone. | 2-amino-5-sulphobenzoic acid. | 1-aminobenzene-4-sulphonic acid. | Reddish yellow. |
| C9 | do | 1-(2'-methyl-3'-amino-5'-sulphophenyl)-3-carboxy-5-pyrazolone. | 1-aminobenzene-3-sulphonic acid. | 1-aminobenzene-3-sulphonic acid. | Do. |
| C10 | do | 1-(3'-amino-4'-sulphophenyl)-3-methyl-5-pyrazolone. | 2-aminotoluene-4:5-disulphonic acid. | 1-methylaminobenzene-3-sulphonic acid. | Do. |
| C11 | do | 1-(2'-methyl-3'-amino-5'-sulphophenyl)-3-5-pyrazolone. | 1-aminobenzene-3-sulphonic acid. | 1-aminobenzene-3-sulphonic acid. | Do. |
| C12 | do | 1-(3'-sulpho-4'-aminophenyl)-3-methyl-5-pyrazolone. | 1-methylaminobenzene-3-sulphonic acid. | 1-methylaminobenzene-3-sulphonic acid. | Do. |
| C13 | 1:4-diaminobenzene-2-carboxylic acid. | 1-(2'-methyl-3'-amino-5'-sulphophenyl)-3-carboxy-5-pyrazolone. | 1-aminobenzene-3-sulphonic acid. | 1-aminobenzene-3-sulphonic acid. | Do. |
| C14 | do | 1-(3'-amino-4'-sulphophenyl)-3-methyl-5-pyrazolone. | Aniline-3:5-disulphonic acid | 2-amino-5-sulphobenzoic acid. | Do. |
| C15 | 2:6-diaminonaphthalene-4:8-disulphonic acid. | 1-(2'-methyl-3'-amino-5'-sulphophenyl)-3-methyl-5-pyrazolone. | 1-aminobenzene-3-sulphonic acid. | 1-aminobenzene-3-sulphonic acid. | Do. |
| C16 | do | 1-(2'-methyl-3'-amino-5'-sulphophenyl)-3-carboxy-5-pyrazolone. | 1-methylaminobenzene-3-sulphonic acid. | do | Do. |
| C17 | 1:3-diaminobenzene-4-sulphonic acid. | do | Ammonia | Aniline-3:5-disulphonic acid. | Greenish yellow. |
| C18 | do | 1-(2'-methyl-3'-amino-5'-sulphophenyl)-3-methyl-5-pyrazolone. | 2-amino-5-sulphobenzoic acid. | Methylamine | Do. |
| C19 | do | 1-(2'-methyl-3'-amino-5'-sulphophenyl)-3-carboxy-5-pyrazolone. | 1-amino-4-chlorobenzene-3-sulphonic acid. | 1-aminobenzene-3-sulphonic acid. | Do. |
| C20 | do | do | 1-amino-4-methoxybenzene-3-sulphonic acid. | do | Do. |

A third class of preferred dyestuffs for use in the new colouration process are those defined by the formula:

$$T^6—A—N=N—E—T^6$$

where A and E have the meanings stated above, one $T^6$ stands for a group of the formula:

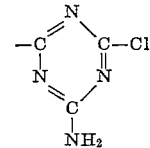

and the other for a group of the formula:

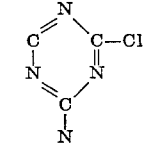

where R has the meaning stated above, each group $T^6$ being connected to A or to E, as the case may be, by way of a nitrogen atom.

This class of dyestuffs can be obtained by coupling a diazotised amine of the formula $T^6—A—NH_2$ with a coupling component of the formula $H—E—T^6$ where the symbols A, E and $T^6$ have the meanings stated above, or by reacting ammonia or an amine of the formula $NH_2R$ with a monoazo compounds of the formula $$T^7—A—N=N—E—T^7$$

where one T⁷ represents one of the groups T⁶ and the other T⁷ represents a dichloro-s-triazine group, each T⁷ being connected to A or to E, as the case may be, by way of a nitrogen atom.

These dyestuffs form a further feature of the invention and their manufacture is illustrated by Examples 20 and 21:

Example 20

A solution of 7.4 parts of cyanuric chloride in 32 parts of acetone is added slowly with stirring to 40 parts of water at 0–4° C. to form a fine suspension. A neutralised solution of 7.55 parts of 1:3-diaminobenzene-4-sulphonic acid in 120 parts of water is added slowly to the suspension with stirring at 0–4° C. and the stirring is continued at 0–4° C. until all the 1:3-diaminobenzene-4-sulphonic acid has reacted. The pH is then raised to 6.0–7.0 by the addition of sodium carbonate solution. A neutral solution of the sodium salt obtained from 7.5 parts of o-toluidine-4-sulphonic acid in 80 parts of water is then added and the temperature is raised to 35–40° C. and stirring continued for 6 hours at pH 5–6 until all the o-toluidine-4-sulphonic acid has reacted.

Separately, a suspension of 7.8 parts of cyanuric chloride in acetone and water is formed as described above. A neutralised solution of 12.8 parts of 1-amino-8-hydroxynaphthalene-3:6-disulphonic acid in 150 parts of water is added slowly to the suspension at 0–4° C. and the mixture is stirred for 2–3 hours until all the 1-amino-8-hydroxynaphthalene-3:6-disulphonic acid has reacted. The solution is filtered cold from the unreacted cyanuric chloride and kept at 0–5° C.

The reaction product of cyanuric chloride, 1,3-diaminobenzene-4-sulphonic acid and o-toluidine-4-sulphonic acid described above is mixed with 20 parts of 2 N sodium nitrite solution and the mixture is cooled to 0° C. 12 parts of concentrated hydrochloric acid are then added in one portion with stirring, when a pale-yellow suspension of the diazonium chloride is formed. Excess of nitrous acid is destroyed by adding sulphamic acid and the suspension of diazonium chloride is added in a stream to the cold solution of the reaction product of cyanuric chloride and 1-amino-8-hydroxynaphthalene-3,6-disulphonic acid with stirring. The pH is gradually raised to 7.0 by dropwise addition of 2 N sodium carbonate solution at 0–4° C. and the reaction mixture is stirred until all the diazonium chloride has reacted.

35 parts of an aqueous solution of ammonia of 17% strength are then added and the mixture is heated at 35–40° C. for 2 hours. When the reaction is complete the pH is adjusted to 7 and the dyestuff is precipitated by the addition of sodium chloride, filtered off, washed with sodium chloride solution and dried at 20–40° C. in vacuo.

The dye so obtained is dyestuff No. A15 of Table A.

Example 21

7.4 parts of cyanuric chloride are reacted with 7.55 parts of 1:3-diaminobenzene-4-sulphonic acid as described in Example 20. 26 parts of an aqueous solution of ammonia of 17% strength are then added and the mixture is heated at 35–40° C. for 2 hours until further chlorine atom on the triazinyl nucleus has reacted.

Separately, 7.8 parts of cyanuric chloride are reacted with 12.8 parts of 1-amino-8-hydroxynaphthalene-3:6-disulphonic acid as described in Example 20 and the solution filtered from the particles of unreacted cyanuric chloride. A neutralised solution of 11 parts of o-toluidine-3(4):6-disulphonic acid in 100 parts of water is added and the mixture is stirred at 35–40° C. and pH 4 for 6–10 hours until one further chlorine atom on the triazine nucleus has completely reacted.

The diazotisation and coupling of the solutions so obtained thereafter follows the procedure described in paragraph 3 of Example 30.

The dye obtained has the constitution:

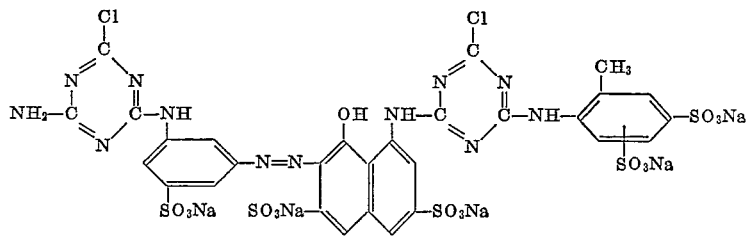

is bluish-red dyestuff and has printing properties similar to the dye described in Example 20.

What we claim is:

1. A monoazo dyestuff of the formula

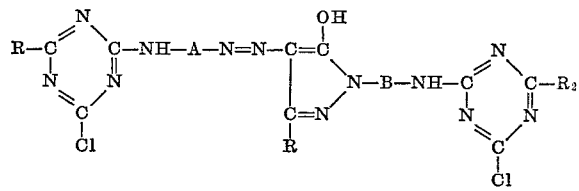

wherein A represents a group selected from the class consisting of sulphophenylene, carboxy phenylene and disulphonaphthylene;

R represents a member selected from the class consisting of amino, anilino, sulphoanilino, and anilino and sulphoanilino substituted on the benzene nucleus by a member selected from the class consisting of $SO_3H$, $CO_2H$, Cl and $CH_3O$ or on the nitrogen atom by methyl;

R₁ represents a member selected from the class consisting of $CH_3$ and $CO_2H$;

B represents a monocyclic aromatic carbocyclic radical selected from the group consisting of phenylene, tolylene and phenylene or tolylene substituted by $SO_3H$; and R₂ represents sulphoanilino or sulphoanilino substituted on the benzene nucleus by a member selected from the class consisting of $SO_3H$, $CO_2H$, $CH_3$, Cl and $CH_3O$ or on the nitrogen atom by methyl.

2. A monoazo dyestuff of the formula:

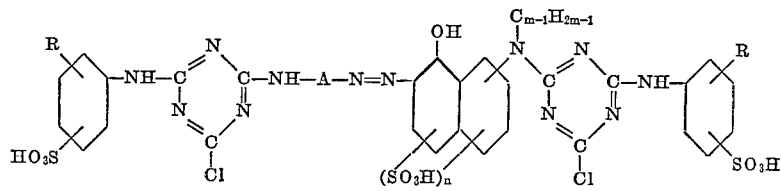

wherein R represents a member selected from the class consisting of $CH_3$, Cl, $CH_3O$, $CO_2H$ and $SO_3H$;

A represents a group selected from the class consisting of sulphophenylene and carboxyphenylene; and m and n each are an integer having the value of 1–2.

3. A monoazo dyestuff of the formula

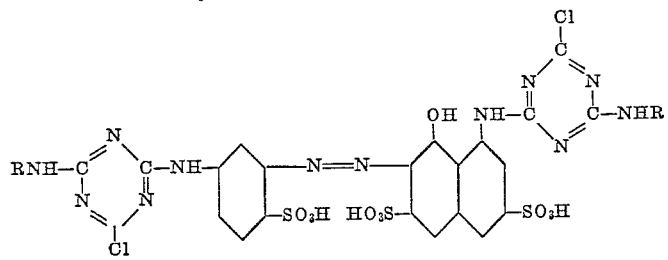

wherein one R represents hydrogen and the other R represents a radical selected from the class consisting of sulphotolyl and disulphotolyl.

4. A monoazo dyestuff as claimed in claim 2 having the formula:

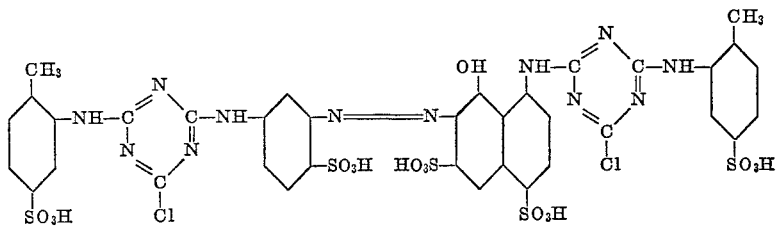

5. A monoazo dyestuff as claimed in claim 1 having the formula:

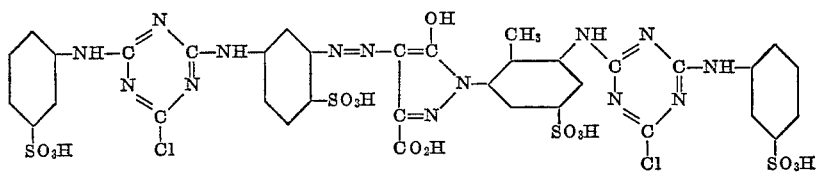

6. A monoazo dyestuff as claimed in claim 1 having the formula

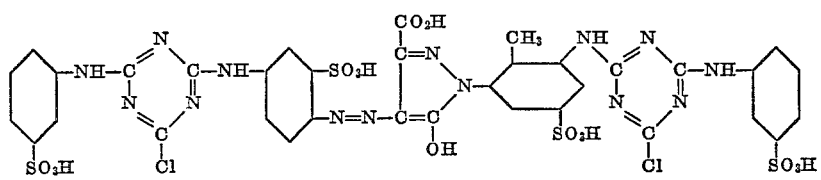

References Cited

UNITED STATES PATENTS

| | | | |
|---|---|---|---|
| 3,117,957 | 1/1964 | Boyd et al. | 260—153 |
| 3,140,280 | 7/1964 | Liebsch et al. | 260—153 |
| 3,149,100 | 9/1964 | Hindermann et al. | 260—153 |
| 3,226,176 | 12/1965 | Hindermann et al. | 260—153 XR |

FOREIGN PATENTS 1,287,648   2/1962   France.

FLOYD D. HIGEL, Primary Examiner

U.S. Cl. X.R.

8—41, 42, 50, 51, 54.2, 63, 71; 260—146, 242, 249, 310